April 15, 1958 E. J. PETHERICK 2,831,184

ELECTRICAL COMPUTING ENGINES

Filed Sept. 27, 1955 2 Sheets-Sheet 1

Inventor
EDWARD JOHN PETHERICK
By Stevens, Davis, Miller & Mosher
Attorneys

*Inventor*
EDWARD JOHN PETHERICK
*By* Stevens, Davis, Miller & Mosher
*Attorneys*

United States Patent Office 2,831,184
Patented Apr. 15, 1958

2,831,184

ELECTRICAL COMPUTING ENGINES

Edward John Petherick, Rowledge, near Farnham, England, assignor to National Research Development Corporation, London, England, a corporation of Great Britain

Application September 27, 1955, Serial No. 536,900

Claims priority, application Great Britain October 1, 1954

12 Claims. (Cl. 340—347)

Figures 1, 2:
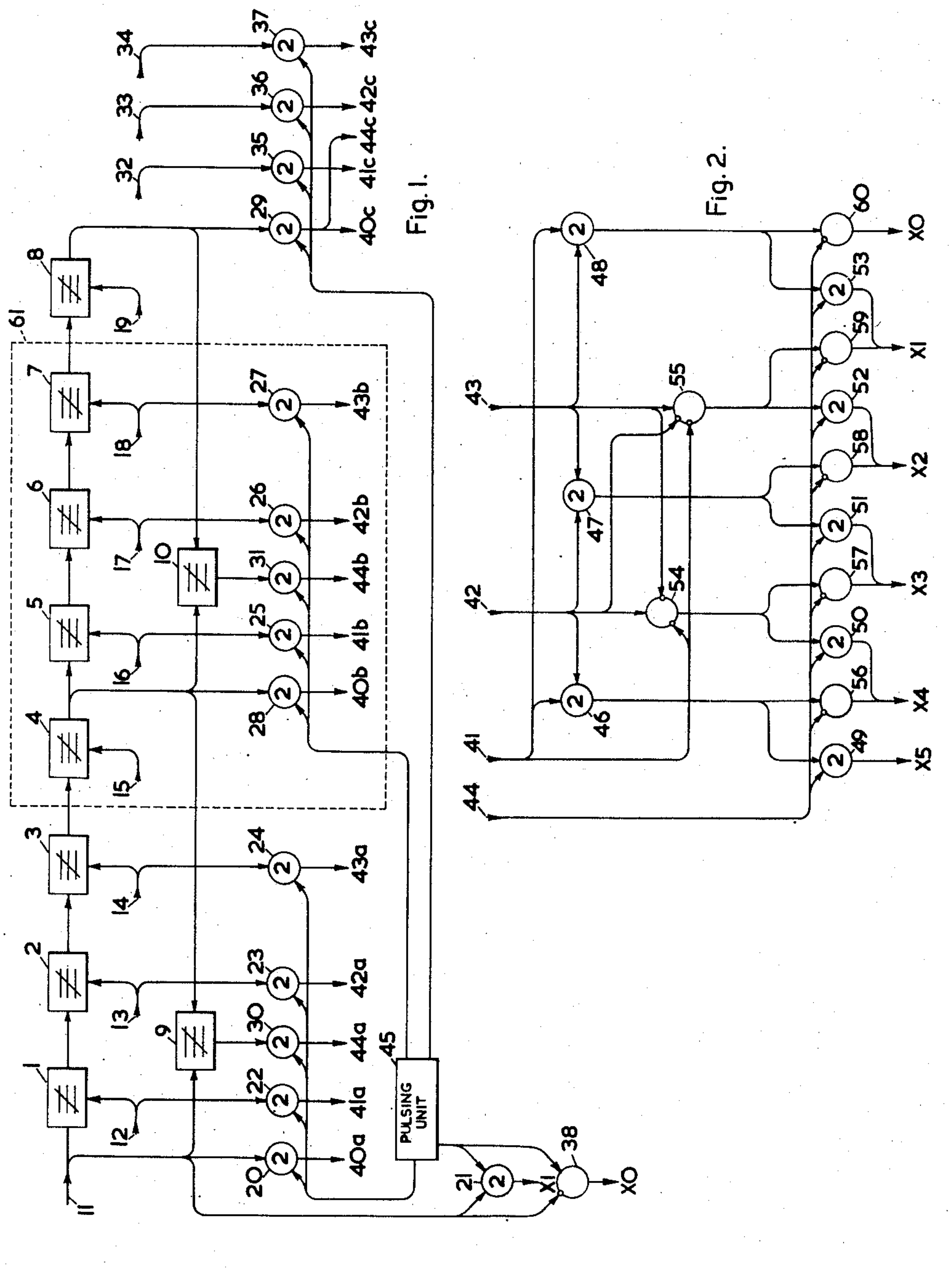

The present invention relates to digital computing engines which work, at least partially, in the decimal scale of notation.

In a digital computing engine, during the process of multiplication, the multiplicand is stored in an arithmetical register and the product of the multiplicand and a multiplier is added to (or subtracted from) the contents of an accumulator. Such addition may take the form of successive additions of the multiplicand to the contents of the accumulator, the number of additions depending upon the value of a multiplier digit. Alternatively, multiples of the multiplicand may be added to the contents of the accumulator, each multiple being the product of the multiplicand and a multiplier digit or of the multiplicand and a multiplier factor derived from one or more multiplier digits. The present invention is concerned with the derivation of multiplier factors from multipliers expressed in a cyclic permuting binary-decimal code of the type described in my co-pending patent application Serial No. 478,031, filed December 28, 1954.

In patent application Serial No. 478,031 there is described a cyclic permuting binary-decimal code in which the digits 0 to 9 of a reflecting cyclic permuting decimal code are represented in a binary code which is cyclic permuting at least for the representation of the digits 0 to 9 and wherein the binary word representing each decimal digit is the same as the binary word representing that decimal digit's nines complement, except for one binary digit termed the complementing binary digit. Also, the binary word representing each odd cyclic permuting decimal digit contains an odd number of binary digits 1.

In the reflecting cyclic permuting decimal code referred to above the code digits corresponding to a normal decimal number are obtained from the normal decimal number by the substitution for a digit in the normal decimal number the nines complement of the digit whenever the immediately preceding digit of greater significance in the normal decimal number is odd.

For the purposes of this specification and the appended claims, a cyclic permuting decimal digit is deemed to have an order of significance in a number expressed in the cyclic permuting decimal code, which is the same as that of the corresponding normal decimal digit in the normal decimal number from which it is derived. Also, any two decimal digits lying next to one another in a decimal number will be referred to hereinafter as having adjacent orders of significance.

In the decoding process, a number expressed in the cyclic permuting decimal code may be changed into normal decimal form by complementing each digit in the code on nine whenever the sum of the preceding digits, that is to say, of higher orders of significance of the code is odd. In the case of the cyclic permuting binary-decimal code, since each odd decimal digit is represented by a binary word having an odd number of binary digits, it follows that in order to change from a binary word representing a cyclic permuting decimal digit to a binary word representing the corresponding normal decimal digit, one has merely to change (from a 0 to a 1 or vice versa) the complementing binary digit (as defined above) in a binary word representing a cyclic permuting decimal digit whenever the sum of the binary digits in binary words representing decimal digits of higher orders of significance is odd. No change, of course, is necessary when this sum is even, for then the decimal to which the binary word refers is in its normal decimal form, as explained above. It is convenient to use a word to describe the resulting complementing binary digit (i. e. in a binary word representing a normal decimal number), whether it has been changed or not. For the purpose of what follows in this specification and the appended claims, such a binary digit will be called a rectified complementing binary digit.

It will be seen that the remaining binary digits in each word remain unchanged during the change from the cyclic permuting binary-decimal form of representation to the binary representation of a normal decimal number. These binary digits indicate a decimal digit N (less than five) or its nines complement depending on whether the complementing binary digit or the rectified complementing binary digit is a 1 or a 0.

An example will now be given in order to make the foregoing discussion more clear. The following binary code for the representation of decimal digits will be used by way of example. No rules can be put forward for the derivation of such a code; but it will be appreciated by those versed in the art that a code conforming to all the conditions laid down above may be readily derived by trial and error.

*Table I*

| Decimal Digit Represented | Binary Code | | | |
|---|---|---|---|---|
| | Digit | | | |
| | W | X | Y | Z |
| 0 | 0 | 1 | 0 | 1 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 1 | 1 | 1 | 0 |
| 6 | 1 | 0 | 1 | 0 |
| 7 | 1 | 0 | 1 | 1 |
| 8 | 1 | 0 | 0 | 1 |
| 9 | 1 | 1 | 0 | 1 |

In this code, the digit W is the complementing binary digit, though clearly this need not apply in the general case. However, for the purposes of the particular embodiment of the invention under consideration the first binary digit is chosen to be the complementing binary digit for ease of circuitry. The remaining (X, Y and Z) digits are the digits which indicate a decimal digit N (less than five) or its nines complement depending on whether the complementing digit is, in this example, a 0 or a 1 respectively.

The transformation of a cyclic permuting binary-decimal coded number to the binary coded form of the corresponding normal decimal number may be illustrated as follows: Let the normal decimal number 74521 be taken. The cyclic permuting decimal form of this number is 75571. The cyclic permuting binary-decimal coded form of this number is, therefore, 1011, 1110, 1110, 1011, 0001. During the transformation, the first binary word remains unchanged as 1011. Because this binary word contains an odd number (3) of binary digits 1, the complementing binary digit of the next binary word is changed and the word becomes 0110. Because the first two binary words contain a total number of digits 1 which is even (6), the third binary word remains unchanged as 1110. The total number of digits 1 in the first three binary words is odd (9) and thus the fourth binary word becomes 0011. The total number of digits 1 in the first four binary words is even (12) and thus the last group remains unchanged as 0001. The transformation is thus complete, yielding the binary words 1011, 0110, 1110, 0011, 0001. This combination represents the normal decimal number 74521. This is the normal decimal number represented by the original cyclic permuting binary-decimal code.

The present invention depends partially on the fact that the binary digits, such as the digits X, Y and Z, in a given binary word define a decimal digit N (less than five) which is either the normal decimal number represented by the code or the nines complement of that number.

In the multiplying stages of certain digital computers (e. g. as described in copending patent application Serial No. 415,609, filed March 11, 1954, by E. J. Petherick and G. C. Rowley), for the purpose of simplifying the machinery used, it is convenient, instead of multiplying the multiplicand by the individual decimal digits (positive or zero) of the multiplier, to multiply by different numbers called factors (positive, negative or zero) which are numerically not greater than five. The means whereby this selection is made is explained below. The selection of multiplier factors are made by successively comparing the digits of a multiplier two at a time starting with the most significant multiplier digit, or alternatively, starting with the least significant multiplier digit and in each case assuming the most significant multiplier digit is preceded by a zero and that the least significant multiplier digit is followed by a zero. During each comparison, a digit N which is less than five, is found which is either one of the multiplier digits or its nines complement. (That is to say, the multiplier digit is either N less than five or $(9-N)$ greater than four.) If this multiplier digit is greater than four, the multiplier factor F, is negative. Further, if the multiplier digit and the next less significant multiplier digit in the multiplier are both greater than four or are both less than five, the multiplier factor F is numerically equal to N. However, if, of the multiplier digit and the next less significant multiplier digit, one is greater than four and the other less than five, the multiplier factor F is numerically equal to $(N+1)$.

This manner of selection of multiplier factors is summarised in the following table:

*Table II*

| Multiplier digit | | N | | | | | 9−N | | | | |
|---|---|---|---|---|---|---|---|---|---|---|---|
| | | 0 | 1 | 2 | 3 | 4 | 5 | 6 | 7 | 8 | 9 |
| Multiplier factor F, required if the next less significant multiplier digit is | <5 | 0 | 1 | 2 | 3 | 4 | −5 | −4 | −3 | −2 | −1 |
| | >4 | 1 | 2 | 3 | 4 | 5 | −4 | −3 | −2 | −1 | −0 |

The manner in which these factors are obtained is as follows. What is required is a decimal number with positive, negative or zero decimal digits numerically not greater than five, the number itself being equal to the original multiplier which has positive or zero digits not greater than nine. Accordingly, any decimal digit greater than five will have to be replaced by the negative of its complement or ten, at the same time increasing the next more significant multipler digit by 1. For example, 0, 9, 0 becomes 1, −1, 0.

This rule as it stands, however, is inconvenient for the purposes of the particular embodiment of the invention under consideration. In this embodiment two digits having adjacent orders of significance are considered together. That is to say, in choosing the multiplier factor corresponding to a digit A, that digit and the digit B having the next smaller order of significance are considered. Applying the above rule A is replaced by the negative of its complement or ten whenever A is greater than five, i. e. A is replaced by $-(10\text{-}A)$ in these circumstances. If at the same time, B is greater than five, A is replaced by $-(10\text{-}A)+1$, that is, $-(9\text{-}A)$, the negative of its nines complement. In the case when A is five and B is greater than five, the multiplier factor corresponding to A becomes $5+1=6$, which is not allowed. Thus when $A=5$ it must be replaced by the negative of its complement on ten if B is greater than five. This becomes less cumbersome and it does no harm if A is replaced by the negative of its complement on ten whenever A is greater than four. For the only case which is altered is when $A=5$ and B is less than or equal to five, and A is replaced by −5, to which there is no objection.

If N is defined by $A=N$ (for $A>5$) or $A=9-N$ (for $A>4$) then clearly N is not greater than five in each case, and A is replaced by N when $A<5$, $B<5$
A is replaced by $N+1$ when $A<5$, $B>4$
A is replaced by $-N$ when $A>4$, $B<5$
A is replaced by $-(N+1)$ when $A>4$, $B>4$, which gives the above table.

It will be seen that the multiplier factors derived, for example, from a multiplier (0) 74521(0) will be 1, −3, 5, −5, 2 and 1. Such multiplier factors may be used to control the addition of multiples of a multiplicand to an accumulator, for example, as described in co-pending patent application Ser. No. 415,611, filed March 11, 1954, by E. J. Petherick and G. C. Rowley. That is to say, if the multiplicand is B then $74521\times B$ may be obtained in the following manner. First $B(=+1\times1\times B)$ is transferred to the accumulator. Then $+2\times10\times B$ is added to what remains in the accumulator, and then $-5\times100\times B$, $+5\times1000\times B$, $-3\times10{,}000\times B$, and $1\times100{,}000\times B$. (Clearly these products may be added in any order whatsoever.) In this way $74521\times B$ is left in the accumulator.

Now as already explained three binary digits, not including the complementing binary digit, in each binary word in the cyclic permuting binary-decimal code define a digit N (less than five) which is either the decimal digit represented by the binary word or its nines-complement. Thus multiplier factors may be selected by decoding these three binary digits to give a decimal digit N and rendering this decimal digit negative and/or increasing it by unity in certain circumstances. Whether or not N should be made negative is determined by examining the rectified complementing binary digit in the binary word from which N is determined. Thus, in the case of the binary code given above, if the rectified complementing binary digit in a binary word is a 1 (that is to say the multiplier digit represented by that binary word is greater than four and equals $9-N$), the multiplier factor F is negative (that is to say either minus N or minus $\overline{N+1}$). Whether or not N should have unity added to it to give the required multiplier factor depends upon a comparison between the rectified complementing binary digits in the binary word already being considered and in the binary word representing the next less significant decimal digit. Thus, if the rectified complementing binary digits in the two binary words are the same, the multiplier factor F equals N, or minus N, and if the rectified complementing binary digits in the two groups differ the multiplier factor F equals $(N+1)$, or minus $(N+1)$.

For the purposes of the explanation below the following definitions are made:

$N_k=N$ corresponding to $k$th decimal digit of multiplier,
$F_k=F$ corresponding to $k$th decimal digit of multiplier, and each multiplicand is assumed to be preceded by a decimal digit 0, for which $N(=N_0)=0$ and $F(=F_0)=0$ or 1. $F_0$ is called the first multiplier factor, $F_1$ the second multiplier factor and so on, so that in general $F_n$ is called the $(n+1)$th multiplier factor, and the $n$th decimal digit always refers to the $(n+1)$th multiplier factor.

If the original example of the representation of the decimal number 74521 be taken, it will be remembered that this was represented in a cyclic permuting binary-decimal code as 1011, 1110, 1110, 1011, 0001. In the rectified form (that is to say, the form in which the complementing binary digits are rectified), the representation is 1011, 0110, 1110, 0011, 0001. If it be assumed that these digits are preceded by the word 0101 representing the decimal digit 0, then $N_0$ is zero. However the rectified complementing binary digit (in this case the first binary digit) in the first binary word proper, that is to say 1011, is a 1, and the rectified complementing binary digits in the two words differ, so that the first multiplier factor $F_0=N_0+1=1$ as explained above. The last three binary digits 011 in the first binary word represent $N_1=2$ by reference to Table I. The rectified complementing binary digit in the first binary word 1011 is a 1 and in the second binary word 0110 it is a 0. By the rules above, the fact that the rectified complementing binary digit in the first binary word is a 1 implies that $F_1$ is negative, and the fact that the rectified complementing binary digits in the first and second binary words are different implies that the numerical value of $F_1$ is $N_1+1$. Thus, the second multiplier factor, $F_1$=minus $(N_1+1)=-3$. The last three binary digits in the second binary word represent $N_2=4$. The rectified complementing binary digit in the second binary word is a 0 and in the third binary word it is a 1. Thus, the third multiplier factor $F_2=N_2+1=5$. The last three binary digits in the third binary word represent $N_3=4$. The rectified complementing binary digit in the third binary word is a 1 and in the fourth binary word it is a 0. Thus, the fourth multiplier factor, $F_3=-(N_3+1)=-5$. The last three binary digits in the fourth binary word represent $N_4=2$. The rectified complementing binary digits in the fourth and fifth binary words are zeros. Thus, the fifth multiplier factor to $F_4=N_4=2$. The last three binary digits of the fifth binary word represent $N_5=1$. The complementing binary digit of this binary word is a 0 and the binary word is assumed to be followed by zero. Thus, the sixth multiplier factor $F_5=N_5=1$. The multiplier factors thus obtained will be seen to be in agreement with those obtained directly from Table II.

According to the present invention, therefore, there is provided a translator for deriving multiplier factors from a number expressed in a cyclic permuting binary-decimal code of the type described and comprising means for receiving a representation of a number in a cyclic permuting binary-decimal code of the type described, means for changing the complementing binary digit in each binary word representing a cyclic permuting decimal digit if the sum of the binary digits in binary words representing cyclic permuting decimal digits of higher orders of significance is odd so that these are provided representations of rectified complementing binary digits, means for detecting the dissimilarity between rectified complementing binary digits in binary words representing decimal digits of adjacent orders of significance and means for decoding the remaining digits of each binary word to yield in each case a multiplier factor of numerical value N less than five, or of numerical value $(N+1)$ if there is dissimilarity between the rectified binary digit in that binary word and the rectified binary digit in the binary word representing the next less significant decimal digit, and for indicating that a multiplier factor corresponding to a binary word is negative if the rectified complementing binary digit in that word is such as to indicate a decimal digit greater than four.

In order that the present invention may be more easily understood, embodiment thereof will now be described, by way of example, with reference to the accompanying drawings, in which Figure 1 is a circuit diagram of part of translator for deriving multiplier factors from a multiplier expressed in a cyclic permuting binary-decimal code.

Figure 3:
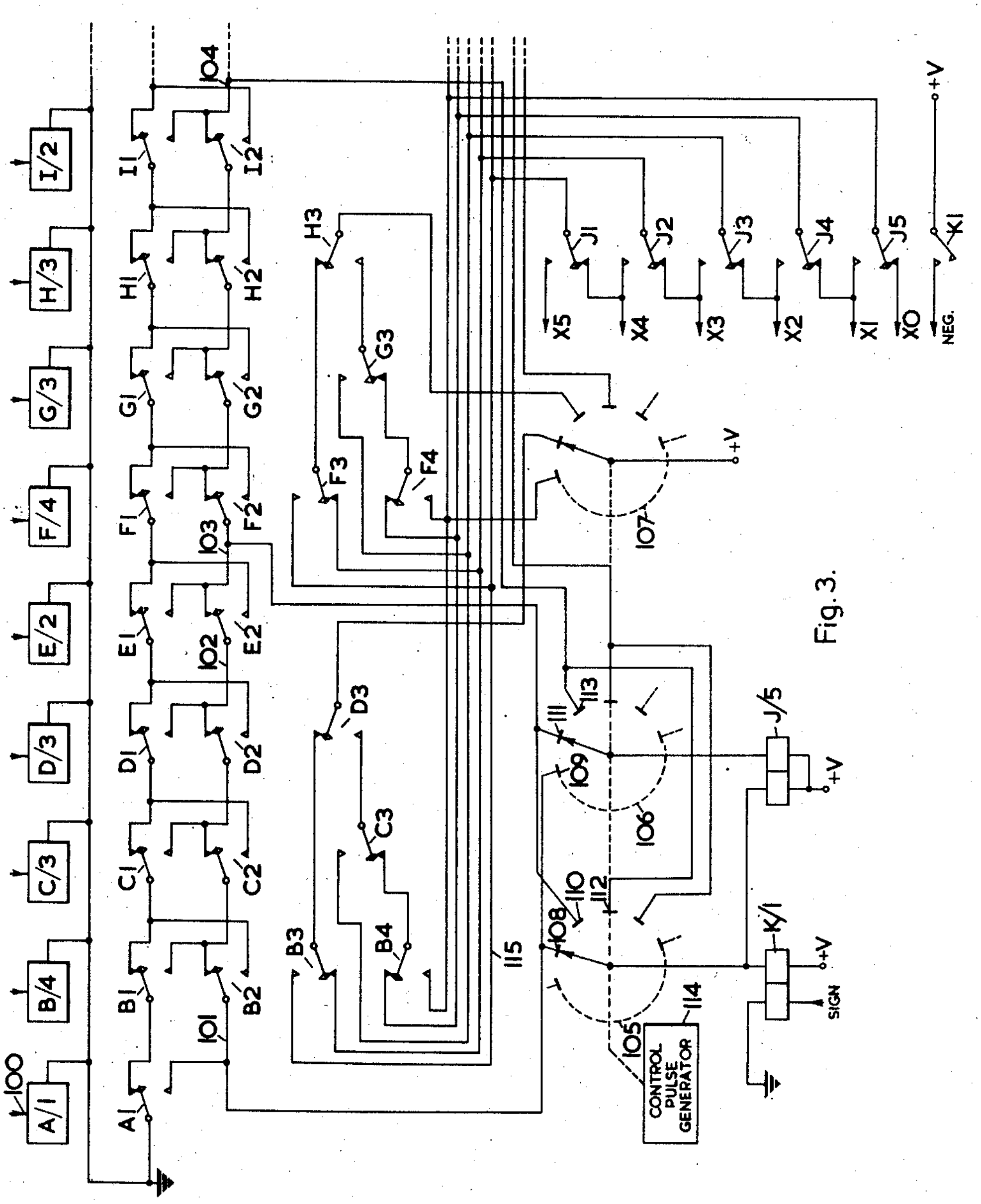

Figure 2 is a circuit diagram of a further part of the translator shown in Figure 1 and Figure 3 is a diagram of a relay circuit for deriving multiplier factors from a multiplier expressed in a cyclic permuting binary-decimal code.

The notation used in Figure 1 and Figure 2 is similar to that explained and used in U. S. Patent No. 2,686,632, issued August 17, 1954. Figure 1 shows ten not-equivalent gates 1 to 10. The not-equivalent gates 1 to 8 are connected in series and are fed from nine external input lines 11 to 19 as shown. The not-equivalent gate 9 is connected between the input line 11 and the output of the not-equivalent gate 4. The not-equivalent gate 10 is connected between the outputs of the not-equivalent gates 4 and 8.

The input line 11 is connected to two and gates 20 and 21 and to the inhibiting connection of an inhibiting gate 38. The input lines 12, 13, 14, 16, 17 and 18 are connected to and gates 22, 23, 24, 25, 26 and 27 respectively. The outputs of the not-equivalent gates 4, 8, 9, and 10 are connected to and gates 28, 29, 30 and 31 respectively and further input lines 32, 33 and 34 are connected to and gates 35, 36 and 37 respectively. The outputs of the gates 20, 28 and 29 are designated **40*a*, 40*b* and 40*c* respectively, the outputs of the gates 22, 25 and 35 are designated 41*a*, 41*b* and 41*c* respectively, the outputs of the gates 23, 26 and 36 are designated 42*a*, 42*b* and 42*c* respectively and the outputs of the gates 24, 27 and 37 are designated 43*a*, 43*b* and 43*c* respectively. The outputs of the gates 30 and 31 are designated 44*a* and 44*b* respectively whilst a second, parallel, output from the gate 29 is designated 44*c***.

A pulsing unit 45 distributes long pulses to the gate 21 and the inhibiting gate 38, to the set of gates 20, 22, 23, 24 and 30, to the set of gates 25, 26, 27, 28 and 31 and to the set of gates 29, 35, 36 and 37 in turn.

Figure 2 shows a circuit comprising a combination of and gates and inhibiting gates for the final conversion of successive outputs from the circuit shown in Figure 1 into outputs indicative of the required multiplier factors. In Figure 2 there are shown four input lines 41 to 44. These input lines are connected to the output lines having the same numerical designation shown in Figure 1. For instance, the input line 41 in Figure 2 is connected to the output lines **41*a*, 41*b* and 41*c*** shown in Figure 1. These connections may be made by means of bus bars (not shown).

The input lines 41 to 44 are connected to a network of and gates 46 to 53 and inhibiting gates 54 to 60. The gates are so arranged that when voltages representing the X, Y and Z digits of the binary code set forth in Table I are presented to the inputs 41, 42 and 43, an output is obtained representing the corresponding decimal digit which is less than five. For example, if the X, Y and Z digits are 0, 1 and 1 respectively, voltages are applied to the input lines 41, 42, 43 as a zero voltage, a positive voltage and a positive voltage respectively. In this case all the gates will either be shut or have zero voltages applied to them except the gates 47 and 58. Thus a positive output voltage will appear on the output line designated X2. If, however, a positive voltage is also applied to the input line 44, the gate 58 will be shut and the gate 51 will be open so that a positive output voltage will appear on the output line designated X3. The output line on which a positive voltage appears indicates the multiplier factor selected according to the input voltages applied to the lines 41 to 43. It will be seen that the indicated multiplier factor is increased by unity if a positive voltage is applied to the input line 44. The manner in which the selected multiplier factor is used in a multiplication operation is described by way of example below.

The operation of the circuits shown in Figures 1 and 2 will now be discussed more fully. Voltages representative of the twelve binary digits of three binary words of the cyclic permuting binary-decimal code (representing three cyclic permuting decimal digits) from which the multiplier factors are to be selected are initially applied to the input lines 11 to 19 and 32 to 34. The binary digit 1 is represented as a positive voltage and the binary digit 0 is represented as a zero voltage. Voltages representing the W (complementing) binary digits of the binary words representing the cyclic permuting decimal number are applied to the input lines 11, 15 and 19 respectively, a voltage representing the W digit of the first binary word representing the most significant cyclic permuting decimal digit, being applied to the input line 11 and so on. Voltages representing the corresponding X digits of the binary words are applied to the input lines 12, 16 and 32, voltages representing the corresponding Y digits of the binary words are applied to the input lines 13, 17 and 33 and voltages representing the corresponding Z digits are applied to the input lines 14, 18 and 34.

Now, if two positive voltages or two zero voltages are applied to the inputs of a not-equivalent gate, a zero voltage output will be obtained from the gate. However, if a zero voltage is applied to one input and a positive voltage is applied to the other input of a not-equivalent gate, a positive voltage output will be obtained from the gate. It follows that if an odd number of positive voltage inputs are applied to the gates 1 to 3 through the input lines 11 to 14, a positive voltage output will be obtained from the gate 3, but a zero voltage output will be obtained if an even number of positive inputs are so applied. Thus the voltage applied to the input line 15 and representing the W binary digit of the second binary word will be changed (i. e. the digit represented by the voltage will be complemented) by the not-equivalent gate 4 if the number of binary digits 1 in the first binary word is odd, but not otherwise. Similarly, the voltage applied to the input line 19 and representing the W binary digit of the third binary word will be changed by the not-equivalent gate 8 if the number of binary digits 1 in the two preceding binary words is odd. The digit represented by the voltage output of a gate such as the gates 4 and 8 is the rectified W (complementing) binary digit.

The voltage representing the rectified W binary digit in the first binary word and the voltage representing the rectified W binary digit in the second binary word are compared in the not-equivalent gate 9 which gives a positive voltage output if the two compared voltages are dissimilar and a zero voltage output if these two voltages are similar. Similarly the voltages representing the rectified W binary digits in the second and third binary words are compared in the not-equivalent gate 10.

After the appropriate voltages have been applied to the input lines 11 to 19 and 32 to 34, the pulsing unit 45 applies a long pulse to the gates 21 and 38 so that the long pulse passes to an output line X1 if the W binary digit in the first binary word is a 1 or to an output line *e*X0 if the W binary digit is a 0. Outputs on the line X0 and X1 in Figure 1 have the same significances as outputs on the lines X0 and X1 respectively in Figure 2. Of course, in practice the output from the gate 38 would be connected to the output from the gate 60 and the output from the gate 21 would be connected to the outputs of the gates 53 and 59. Next, a long pulse from the pulsing unit 45 is applied to the gates 20, 22, 23, 24 and 30 so that the long pulse passes to the output lines 40*a*, 41*a*, 42*a*, 43*a* and 44*a* if those gates are open. The voltages on the output lines 41*a* to 44*a* are passed to the lines 41 to 44 respectively in the circuit shown in Figure 2 to determine the numerical value of the multiplier factor. The output line 40*a* provides a voltage which, if positive, indicates a negative multiplier factor and, if zero, indicates a positive multiplier factor. The output lines 40*a*, 40*b* and 40*c* are connected to a common bus bar (not shown).

Next, a long positive pulse from the pulsing unit 45 is applied to the gates 25, 26, 27, 28 and 31 and the next multiplier factor is determined. Next, a long positive pulse from the pulsing unit 45 is applied to the gates 29, 35, 36 and 37 and thus the last multiplier factor is determined.

In order that the operation of the circuit shown in Figures 1 and 2 may be made more clear an example will now be taken. Let it be assumed that the normal decimal number represented by the coded input to the circuit is 735. The equivalent cyclic decimal code is 764 which, expressed in the binary code used in the present example is 1011, 1010, 0110. The voltages applied to the input lines 11 to 19 and 32 to 34 will be +,0, +, +, +, 0, +, 0, 0, +, + and 0 volts respectively. Thus there will be a zero voltage output from the gate 4 and a positive voltage output from the gate 8. There will also be positive voltage output from the gates 9 and 10.

It follows that when the pulsing unit 45 operates, the following outputs will be obtained. When a pulse is applied to the gates 21 and 38, and output will be obtained at X1 indicating a multiplier factor of 1. This indication, when applied to the remainder of a computing engine will, because of a subsequent shift between the arithmetical register and the accumulator effectively result on the addition of the one-thousandth multiple of the multiplicand to the accumulator.

When the pulsing unit applies a long pulse to the gates 20, 22, 23, 24 and 30, a positive voltage output is obtained on each of the output lines 40*a*, 42*a*, 43*a*, and 44*a* and a zero voltage output is obtained on the output line 41*a*. Since there is a positive voltage output on the line 40*a* the multiplier factor will be negative. Further, it will be seen from Figure 2 that positive voltage inputs on lines 42, 43 and 44 will produce positive voltage output on the output line X3. The multiplier factor indicated is therefore minus 3 (indicating that the three-hundredth multiple of the multiplicand should be subtracted from the accumulator).

When the pulsing unit 45 applies a pulse to the 25, 26, 27, 28 and 31, a positive voltage output is obtained on each of the output lines 42*b* and 44*b* and a zero voltage output is obtained on each of the output lines 40*b*, 41*b* and 43*b*. Thus the multiplier factor is indicated as being positive. Also, the application of positive voltages to the lines 42 and 44 (Figure 2) will result in a positive voltage output on the line X4 thus indicating a multiplier factor of 4.

When the pulsing unit 45 finally applies pulses to the gates 29, 35, 36 and 37, a positive voltage output will be obtained on each of the output lines 40*c*, 41*c*, 42*c* and 44*c* and a zero voltage output will be obtained on the output line 43*c*. Thus a negative multipler factor is indicated. Also the consequential application of positive voltages to the input lines 41, 42 and 44 of the circuit shown in Figure 2 results in a positive output voltage on the output line X5. Thus a multiplier factor of minus five is indicated.

It will be seen that the outputs indicating multiplier factors of +1, —3, +4 and —5 will indicate that multiplication by 1,000, —300, +40 and —5 should take place. That is to say, multiplication by 735 should take place such that no individual multiplier factor should be greater than five.

Although the circuit shown in Figure 1 is designed to select multiplier factors from only twelve binary digits of the cyclic permuting binary-decimal code, it may readily be modified to handle any 4P binary digits, where P is a positive integer. The only modification required is the introduction of further sets of gates, such as the set enclosed within the dotted line 61, connected in series between, say, the gate 7 and the gate 8. The not-equivalent gates, such as the gate 10, are then connected one between the outputs of every fourth series-connected not-equivalent gate.

Figure 3 is a circuit diagram of part of a relay circuit for effecting the selection of multiplier factors from a multiplier presented in parallel coded form. The circuit as shown will handle only nine binary digits forming only two binary words plus one digit of a third binary word of the cyclic permuting binary-decimal code. Thus the circuit must be extended to the right (as shown in the drawing) if a multiplier of more than two decimal digits are to be handled. The dotted lines indicate that such an extension may be made. The circuit comprises nine relays A/1, B/4, C/3, D/3, E/4, G/3, H/3 and I/2 which have contacts A1, B1, B2 etc, as shown. Voltages are applied to the relays via input lines, such as that shown at 100, so that each relay is energised when the corresponding digit is a 1. The voltages corresponding to the digits of the code are fed to the relays in parallel, a voltage corresponding to the complementing (W) binary digit of the binary word representing the most significant cyclic permuting decimal digit being fed to the relay A/1 and so on. The relays may have latch contacts (not shown) so that once energised they remain so until positively released. In this manner the relays may be made to act as a register. The relay change-over contacts A1, B1, B2, C1, C2, D1, D2, E1, E2, F1, F2, G1, G2, H1, H2, I1 and I2 perform much the same function as the not-equivalent gates 1 to 8 shown in Figure 1. Thus, if the complementing (W) binary digit in the first (most significant) binary word is a 1 the relay A/1 is energised and a line 101 is earthed. However, if this W binary digit is a 0, the relay A/1 is not energised and the line 101 is not earthed.

Similarly, a line 102 is earthed if the number of digits 1 in the first binary word is odd. In this manner the line 103 is earthed only when the rectified W binary digit of the second (next less significant) binary word is a 1. That is to say when the W binary digit of the second binary word is a 1 and the number of the preceding digits 1 is even or when this W binary digit is a 0 and the number of the preceding digits 1 is odd. In a similar manner, a line 104 is earthed only when the rectified W binary digit in the third binary word is a 1.

It may be considered that the relay change-over contacts B1 to I1 and B2 to I2 form two channels from one of which outputs are taken (in a manner to be described hereinafter) at lines 101, 103 and 104. These outputs represent the complementary binary digits of binary words and depend upon the states of the relays.

The circuit also comprises an uniselector having three levels 105, 106 and 107. The levels 105 and 106 have fixed contacts 108 and 109 respectively which are both connected to the line 101. Similarly two fixed contacts 110 and 111 are connected to the line 103 and two fixed contacts 112 and 113 are connected to the line 104. Other contacts on the levels are connected to similar lines (not shown) associated with relays set up in accordance with other digits representing a multiplier. The wiper contacts of the two levels 105 and 106 are connected one to each of the two windings of a differential relay J/5. The other ends of the two windings are connected to a source of voltage positive with respect to earth. In this manner the relay J/5 is arranged to operate only when one of the wiper contacts of the two levels 105 and 106 is earthed and the other is not. The relay J/5 has five relay contacts J1 to J5 the functions of which will be explained hereinafter.

Also connected to the wiper contact of the uniselector level 105 is one winding of a differential relay K/1, the other end of this winding being connected to a source of voltage positive with respect to earth. One end of the other winding of the relay K/1 is connected to earth and the other end thereof either is left open circuit or is connected to a source of voltage positive with respect to earth (at the input designated SIGN) according to whether it is desired to add a product or to subtract a product from an associated accumulator.

A relay contact K1 is closed by the relay K/1 to give a positive voltage output on the line designated NEG only when the multiplier factor is negative (or made artificially negative by the application of a positive voltage to the input designated SIGN).

The third level 107 of the uniselector as arranged to connect the relay contacts D3, H3, and subsequent similar contacts (not shown) sequentially to a source of positive voltage.

The three levels of the uniselector are driven from contact to contact in synchronism with one another under the control of a control pulse generator 114.

The network of relay contacts B3, B4, C3 and D3 is employed to decode the remaining X, Y and Z binary digits of the first (most significant) binary word. Similarly the network of relay contacts F3, F4, G3 and H3 is employed to decode the X, Y and Z binary digits of the second binary word. Since the W binary digits are not represented in this decoding process, the output given by each network of relay contacts is indicative of the decimal number N originally encoded or the complement on nine ($9-N$) of that number. Thus the output may be considered as indicative of some decimal number N less than four. Each output line from each network of relay contacts is connected to an appropriate bus bar which connects together all the output lines capable of giving the same indication in all similar networks of relay contacts. The selection of the network of relay contacts to give an effective output at a desired time is made by the uniselector level 107 which is shown in Figure 3 as selecting the first network of relay contacts by routing a positive voltage to the contact D3.

The bus bars are connected one to each of the relay contacts J1 to J5. The fixed contacts of the relay J/5 are connected to the five output lines X0 to X5 as shown so that, for example, a positive voltage on one of the bus bars 115 is connected to the output line X4 when the relay J/5 is not operated and is connected to the output line X5 when the relay J/5 is operated. The presence of a positive voltage on one of the output lines X0 to X5 indicates a multiplier factor F having one of the numerical values 0 to 5 respectively and the presence of a positive voltage on the output line NEG indicates that the multiplier factor is negative. Thus, it will be seen that the effect of the relay J/5, when operated, is to add unity to the numerical value of the multiplier factor indicated at the outputs of the decoding relay contact networks. It will be remembered the relay J/5 is operated when the rectified complementing (W) binary digits in two adjacent binary words are dissimilar. The voltages representing the rectified complementing (W) binary digits in adjacent binary words are routed to the relay J/5 by the uniselector levels 105 and 106. Thus, it follows that if the uniselector is rotated one step at a time as the different multiplier factors are required, the multiplier factors will be indicated sequentially at the output lines of the circuit.

It will be noted that the first fixed contact on the uniselector level 105 is open circuit. This is to simulate the effect of a zero preceding the multiplier digits.

In order to make the function of the circuit more clear, an example will now be taken. Let it be assumed that the coded input to the circuit is 1011, 1110, 0011, representing the normal decimal number 742 (752 in the cyclic permuting decimal code). The required multiplier factors are, therefore, 1, −3, 4 and 2. The relays A/1, C/3, D/3, E/2, F/4 and G/3 will be operated by input voltages applied thereto in accordance with the code. Also energised will be two further relays in the group of four relays of which I/2 is the first.

Initially the moving contact of the uniselector level 106 will be assumed to be in contact with fixed contact 109 and the moving contacts of the other uniselector levels are in contact with their corresponding fixed contacts. There is no connection to the fixed contact on the uniselector level 105 so that there is no current through the left-hand winding (as shown in the drawing) of the relay J/5 nor through the right-hand winding of the relay K/1. It will be assumed that there is a zero voltage input to the input line designated SIGN so that the relay K/1 will not be operated and there will be no output on the output line designated NEG. The multiplier factor is, therefore, positive. The relay A/1 is operated so that the line 101 is earthed. The relay J/5 will be operated by current flowing through its right-hand winding. The uniselector level 107 connects the positive voltage source to the bus bar which is connected to the relay contact J5. This relay contact is in the operated position so that a positive voltage output is obtained on the output line X1. This indicates a multiplier factor of 1 (corresponding to the addition of the 1000th multiple of a multiplicand to an accumulator).

The uniselector is then stepped by a pulse from the control pulse generator 114 so that the moving contacts engage the fixed contacts 108, 111 et cetera. Now the fixed contact 108 is connected to the earthed line 101 so that the relay K/1 is operated and an output is obtained on the output line designated NEG indicating that the multiplier factor is negative. Also, current will flow through the left-hand winding of the relay J/5. Because the relays A/1, C/3, D/3 and E/2 are all operated, the line 103 will not be earthed. Thus the contact 111 will not be earthed, current will not flow through the right-hand winding of the relay J/5. The relay J/5 will, therefore, be operated. The uniselector level 107 connects the positive voltage source to the relay contact D3. The relays D/3 and C/3 are operated so that the positive voltage source is connected via the uniselector level 107 to the bus bar which is connected to the relay contact J3. This relay is in its operated position so that a positive voltage appears at the output line X3 as well as on the output line NEG. The multiplier factor now indicated is minus 3 (corresponding to the subtraction of the 300th multiple of a multiplicand from an accumulator).

The uniselector is then stepped by a pulse from the control pulse generator 114 so that the moving contacts engage the fixed contacts 110, 113 et cetera. As before, the line 103 is not earthed, so that the relay K/1 is not operated and no current flows through the left-hand winding of the relay J/5. Because the relays A/1, C/3, D/3, E/2, F/4 and G/3 are all operated, the line 104 is not earthed either so that the contact 113 is not earthed and no current flows through the right-hand winding of the relay J/5. This relay is not, therefore, operated. The uniselector level 107 connects the positive voltage source to the relay contact H3. The relay F/4 is operated and the relay contact F3 is in its operated condition. The positive voltage source will, therefore, be connected to the bus bar which is connected to the relay contact J1. Because the relay J/5 is not operated, the line X4 will be energised, indicating a multiplier factor of 4 (corresponding to the addition of the 40th multiple of a multiplicand to an accumulator).

The uniselector is then stepped by a further pulse from the control pulse generator 114 so that the moving contacts engage the fixed contacts 112 et cetera. Now, the line 104 is not earthed so that no current will flow through the relay K/1 or the left-hand winding of the relay J/5.

Although the circuit of Figure 3 has been drawn so as to indicate that more than twelve binary digits may be employed to provide more than three or four multiplier factors, it will be assumed for the purpose of this example that the circuit is designed to receive an input of only twelve binary digits. In this case, the remaining three relays (not shown) will not have change-over contacts such as B1 and B2, C1 and C2 et cetera but will have only a network of contacts similar to the network of contacts B3, B4, C3, and D3 respectively. Further, since for the selection of multiplier factors it is assumed that the last normal decimal digit of a multiplier is followed by zero, the contact on the uniselector level 106 on which the moving contact will now stand is left open circuit (as in the case of the first fixed contact on the uniselector level 105, when it was required to simulate the effect of the first normal decimal digit of a multiplier being preceded by zero). It follows, therefore, that there will be no current drawn through the right-hand winding of the relay J/5 and that this relay will not be operated. The uniselector level 107 connects the positive voltage source to the contacts of the network of three relays (not shown) receiving voltages representative of the XY and 2 binary digits of the third binary word, whence it is routed to the relay contact J3. Because the relay J/5 is not operated, the output line X2 is energised, indicating a multiplier factor of 2 (corresponding to the addition of the 2nd multiple of a multiplicand to an accumulator). In this manner all the required multiplier factors have been obtained.

Although the embodiments hereinbefore described are specifically designed to operate upon a multiplier coded in the cyclic permuting binary-decimal code corresponding to the binary code set forth in Table 1, clearly other binary codes representing decimal digits and conforming with the requirements of the cyclic permuting binary-decimal code may be operated on by similar circuits which are only slightly modified. Examples of other suitable binary codes are given in patent application Serial No. 478,031. The modifications to Figures 1, 2 and 3 necessary for them to operate with any one of the alternative binary codes will mainly concern the network of gates in Figure 2 and the networks of relay contacts in Figure 3 and will be apparent to those versed in the art.

Furthermore, although the circuits described with reference to the drawings are adapted to operate only with digital information presented in parallel form, the invention is not limited to circuits having such a mode of operation. It will be appreciated that the invention also applies to circuits adapted to operate with digital information presented in serial form. In such a case, at least part of two binary words would be held in a register in order to determine the multiplier factor. A further memory device, such as a trigger, may be used to store information as to whether the total number of binary digits 1 in binary words representing cyclic permuting decimal digits of higher orders of significance was odd or even, in order to obtain the necessary rectification of the complementing binary digits held in the register.

I claim:

1. A translator for deriving multiplier factors from a number expressed in a cyclic permuting binary-decimal code in which the digits 0 to 9 of a reflecting cyclic permuting decimal code are represented in a binary code which is cyclic permuting at least for the representation of the digits 0 to 9, the binary word which represents each decimal digit being the same as the binary word which represents that decimal digit's nines-complement except for one complementing binary digit, the sum of the binary digits in any binary word being odd when the decimal digit represented by that word is odd, the translator comprising means for receiving a representation of a number in a cyclic permuting binary-decimal code of the type described, means for changing the complementing binary digit in each binary word representing a cyclic permuting decimal digit if the sum of the binary digits in binary words representing cyclic permuting decimal digits of greater significance than the cyclic permuting decimal digit represented by the said each binary word is odd, and not changing the complementing binary digit otherwise, to yield in all cases representations of rectified complementing binary digits, means for detecting dissimilarity between rectified complementing binary digits in binary words representing decimal digits of adjacent orders of significance, and means for decoding the remaining digits of each binary word to yield in each case a multiplier factor of numerical value N, which is less than five, or of numerical value $(N+1)$ if there is a dissimilarity between the rectified binary digit in that binary word and the rectified binary digit in the binary word representing the next less significant decimal digit, and for indicating that a multiplier factor corresponding to a binary word is negative if the rectified complementing binary digit in that binary word is such as to indicate a decimal digit greater than four.

2. A translator as claimed in claim 1 and wherein means for changing the complementing binary digit of a binary word representing a cyclic permuting decimal digit comprises a plurality of series-connected not-equivalent gates, the first of which is arranged to be fed with voltages representative of two binary digits of the binary word representing the most significant cyclic permuting decimal digit, the last of which is arranged to be fed with a voltage representative of the said complementing binary digit and the remainder of which are each arranged to be fed with a voltage representative of a selected one of the rest of the binary digits representing cyclic permuting decimal digits of higher orders of significance.

3. A translator as claimed in claim 2 and wherein the means for detecting dissimilarity between rectified complementing binary digits in binary words representing decimal digits of adjacent orders of significance comprises a plurality of not-equivalent gates, each arranged to receive signals representative of rectified complementing binary digits in binary words representing decimal digits of adjacent orders of significance.

4. A translator as claimed in claim 3 and wherein the means for decoding the remaining digits of each binary word comprises a network of and gates and inhibiting gates arranged to be fed sequentially with signals representative of each binary word representing a decimal digit in turn, together with signals representative of the dissimilarity or similarity between the rectified complementing binary digit of each same binary word and the rectified complementing binary digit of the binary word representing the next less significant decimal digit.

5. A translator as claimed in claim 1 and wherein means for changing a complementing binary digit in a binary word representing a cyclic permuting binary digit comprises a first relay having a winding arranged to receive a voltage representing a binary digit of the binary word representing the most significant cyclic permuting decimal digit and having a change-over contact arranged to provide a predetermined voltage on either one of two channels, a plurality of relays each arranged to receive voltages representing a selected one of the rest of the binary digits in binary words representing cyclic permuting decimal digits of higher orders of significance then the said cyclic permuting binary digit and each having change-over contacts connected into the channels so as to connect the predetermined voltage to one or other of the channels according to the states of energisation of the relays and a further relay having a winding arranged to receive a voltage representing the said complementing binary digit and having change-over contacts connected to the channels so as to direct the predetermined voltage to one of two outputs according to the states of the relays.

6. A translator as claimed in claim 5 and wherein the means for decoding the remaining digits of each binary word and the means for detecting dissimilarity between rectified complementing binary digits in binary words representing decimal digits of adjacent orders of significance together comprise a network of relay contacts associated with the relays arranged to receive voltages representative of the remaining binary digits, a differential relay having two windings and having contacts connected to the network of relay contacts so as to provide an output representing a multiplier factor N if the relay is not energised and a multiplier factor $(N+1)$ if the relay is energised and means for connecting one winding of the differential relay to an output from one of the channels representing the rectified complementing binary digit of the binary word and the other winding of the differential relay to an output from one of the channels representing the rectified complementing binary digit of the binary word representing the next less significant decimal digit so as to energise the relay when those rectified complementing binary digits are dissimilar.

7. A translator as claimed in claim 6 and wherein there is provided a uniselector having three levels, one level of which is arranged to connect a voltage source successively to each network of relay contacts for decoding the remaining binary digits of each binary word, a second level of which is arranged to connect one winding of the differential relay successively to outputs from one of the channels representing the rectified complementing binary digit of each corresponding binary word and the third level of which is arranged to connect the other winding of the differential relay successively to outputs from one of the channels representing the rectified complementing binary digits of each binary word corresponding to a decimal digit of next less significance.

8. A translator for deriving multiplier factors from a number expressed in a cyclic permuting binary-decimal code in which the digits 0 to 9 of a reflecting cyclic permuting decimal code are replaced in a binary code which is cyclic permuting at least for the representation of the digits 0 to 9, the binary word which represents each decimal digit being the same as the binary word which represents that decimal digit's nines-complement except for one complementing binary digit, the sum of the binary digit in any binary word being odd when the decimal digits represented by that word is odd, the translator comprising means for receiving a representation of a number in a cyclic permuting binary-decimal code of the type described, means for rectifying the complementing binary digit in each binary word representing a cyclic permuting decimal digit by changing the said complementing binary digit if and only if the sum of the binary digits in binary words representing cyclic permuting decimal digits of greater significance than the said cyclic permuting decimal digit is odd so as to provide representations of rectified complementing binary digits, means for detecting dissimilarity between rectified complementing binary digits in binary words representing decimal digits of adjacent orders of significance, and means for decoding the remaining digits of each binary word to yield in each case a multiplier of numerical value N, which is less than five, or of numerical value $(N+1)$ if there is a dissimilarity between the rectified binary digit in that binary word and the rectified binary digit in the binary word representing the next less significant decimal digit, and for indicating that a multiplier factor corresponding to a binary word is negative if the rectified complementing binary digit in that binary word is such as to indicate a decimal digit greater than four.

9. A translator as claimed in claim 8 and wherein means for changing the complementing binary digit of a binary word representing a cyclic permuting decimal digit comprises a plurality of series-connected not-equivalent gates, the first of which is arranged to be fed with voltages representative of two binary digits of the binary word representing the most significant cyclic permuting decimal digit, the last of which is arranged to be fed with a voltage representative of the said complementing binary digit and the remainder of which are each arranged to be fed with a voltage representative of a selected one of the rest of the binary digits representing cyclic permuting decimal digits of higher orders of significance.

10. A translator as claimed in claim 9 and wherein the means for detecting dissimilarity between rectified complementing binary digits in binary words representing decimal digits of adjacent orders of significance comprises a plurality of not-equivalent gates, each arranged to receive signals representative of rectified complementing binary digits in binary words representing decimal digits of adjacent orders of significance.

11. A translator as claimed in claim 10 and wherein the means for decoding the remaining digits of each binary word comprises a network of and gates and inhibiting gates arranged to be fed sequentially with signals representative of each binary word representing a decimal digit in turn, together with signals representative of the dissimilarity or similarity between the rectified complementing binary digit of each same binary word and the rectified complementing binary digit of the binary word representing the next less significant decimal digit.

12. A translator for deriving multiplier factors from a number expressed in a cyclic permuting binary-decimal code in which each digit of a reflecting cyclic permuting decimal code is represented by a binary word in a binary code which is cyclic permuting at least for the representation of the digits 0 to 9, an odd decimal digit being represented by an odd number of binary digits and each binary word representing a cyclic permuting decimal digit differing from the binary word representing the cyclic permuting decimal digit's nines-complement by a difference in form of a single complementing binary digit, the translator comprising means for receiving a representation of a number in a cyclic permuting binary-decimal code of the type described, means for changing the complementing binary digit in each binary word representing a cyclic permuting decimal digit if and only if the sum of the binary digits in binary words representing cyclic permuting decimal digits of greater significance than the said cyclic permuting decimal digit is odd, means for detecting dissimilarity between complementing binary digits, changed if necessary, in binary words representing decimal digits of adjacent orders of significance, and means for decoding the remaining digits of each binary word to yield in each case a multiplier of numerical value N, which is less than five, or of numerical value $(N+1)$ if there is a dissimilarity, between the complementing binary digit, changed if necessary, in that binary word and the complementing binary digit, changed if necessary, in the binary word representing the next less significant decimal digit, and for indicating that a multiplier factor corresponding to a binary word is negative if the complementing binary digit, changed if necessary, in that binary word is such as to indicate a decimal digit greater than four.

References Cited in the file of this patent

UNITED STATES PATENTS

| | | |
|---|---|---|
| 2,512,038 | Potts | June 20, 1950 |
| 2,634,052 | Bloch | Apr. 7, 1953 |